United States Patent [19]

Mills et al.

[11] Patent Number: 4,955,441
[45] Date of Patent: Sep. 11, 1990

[54] LOAD CELL MOUNTING FOR ROTATIONAL CONTROL

[75] Inventors: Nigel G. Mills, Worthington; Larry C. Heckendorn, Columbus; Curtis W. Long, Worthington; Richard T. Smigel, Westerville, all of Ohio

[73] Assignee: Toledo Scale Corporation, Worthington, Ohio

[21] Appl. No.: 412,835

[22] Filed: Sep. 26, 1989

[51] Int. Cl.$^5$ ...................... G01G 21/24; G01G 19/02
[52] U.S. Cl. ...................................... 177/255; 177/134
[58] Field of Search ........................ 177/211, 255, 134; 73/862.65

[56] References Cited

U.S. PATENT DOCUMENTS

| | | | |
|---|---|---|---|
| 3,123,166 | 3/1964 | Schellentrager | 177/211 |
| 3,621,927 | 11/1971 | Ormond | 177/211 X |
| 4,248,317 | 2/1981 | Rahay | 177/211 X |
| 4,702,329 | 10/1987 | Click | 73/862.65 X |
| 4,804,053 | 2/1989 | Nordstrom | 177/255 X |

Primary Examiner—George H. Miller, Jr.

[57] ABSTRACT

Load cells incorporating rocker pin configured columnar central structures within a weighing system have the attribute of self-erecting upon being displaced from a vertical orientation due to dynamic transverse loading effects, as may be occasioned by vehicle movements onto a scale. The resultant transient vector forces thus developed have been observed to cause a rotational phenomenon in the rocker pin configured cells which causes unacceptable damage to the instrumentation control communication components of the load cell system. A mounting technique for such load cells is developed wherein only these rotation inducing forces are restrained, while the vertical force vectors representing valid load data are maintained in an unrestricted or uncompromised manner. In one aspect of the invention, a hexagonal form of mounting between a rocker pin neck-contact surface region and a corresponding receiver cavity achieves a fully pivoting and freely abutting geometry while effecting the noted restriction of rotation. In another aspect, a resilient device such as spring is loaded during restricted rotational movement of the load cell and released at the termination of the transient rotational forces to return the load cells to their initial orientation while the load cells remain under load induced compression.

32 Claims, 4 Drawing Sheets

LOAD CELL MOUNTING FOR ROTATIONAL CONTROL

BACKGROUND OF THE INVENTION

Over the recent past, weighing systems have been developed employing load cells structured in the manner of the so-called "rocker pin". An important advantage realized with this innovation stems from the self-erecting characteristic of the rocker pin configuration. When the normally upright pin is deflected by a horizontally directed force component experienced within the weighing system, it will return to its upright position when the deflecting force terms are removed. A detailed description of such load cells is provided in Dillon, et al., U.S. Pat. No. 4,815,547, issued Mar. 28, 1989, entitled "Load Cell" and assigned in common herewith.

Generally, a number of the rocker pin configured load cells are supported in freely pivotal abutting fashion at their lower end by a ground base through the medium of a receiver component or the like. From this lower contact, the cells extend in vertical columnar fashion to an upper contact surface which, again, is in freely abutting contact with the downwardly disposed surface of a platform or frame having a loading surface adopted to carry the load to be weighed.

The self-erecting feature is developed by configuring the cell or pin component thereof so that the radius of curvature of each end or contact surface is greater than one-half of the total height of the pin. Supported upon such load cell structures, the scale platform and associated horizontal loading surface exhibit several degrees of freedom of movement. Thus it is necessary to accommodate for temporary transverse forces or side loads or lateral forces induced by eccentric loading. For example, when weighing vehicles such as trucks, forward movement and braking, as well as maneuvering during scale entry will be the occasion of acceleration, deceleration, and induced turning moments and the like imposed through the platform in addition to vertical weight force vectors. Typically the extent of lateral travel of the platform is restricted to within small tolerances by bumper structures.

Instrumentation of the rocker pin configured load cells is provided through the media of strain gauges coupled with the columnar or rocker pin components of the structure. This instrumentation may, for example, be protected by employing conventional circuit potting procedures or, may be contained within a protective, sealed, can-like enclosure suspended about the central portion of the rocker pin configured counterforce. Necessary power source inputs to and signal outputs from the enclosed circuitry typically extends through a port or connector connected at the side of the enclosure. Requisite cabling or wiring extends from that connector to power and data gathering systems and the like.

Field experience with these weighing systems has revealed that the temporary transverse or side forces associated by the noted dynamic loads will engender a turning movement in the load cells about the longitudinal or columnar axes of the rocker pin structures. This rotational movement is developed by the somewhat rolling interaction of the contact surfaces of the load cells with an associated support or platform surface. While rocker pin structuring provides for a return to vertical upon removal of transverse loads, the point of contact of such surfaces may vary to evoke a point-to-point progression, the motion of the cells being observed to be somewhat precessional in nature. Particularly where the temporary lateral forces at the weighing platform are bi-directional or, in effect, rotational, this progression of contact point positions, induces turning force vectors within the load cells to promote this rotation. Such rotation can be destructive to any appurtenances extending from the load cells. In this regard, the rotation tends to stress or "wind up" cabling or wiring extending to the load cell instrumentation, causing its breakage with resultant operational loss Necessary repair to the load cells typically involves a substantial labor investment associated, for example, with the jacking up of the platform, the correction of an affected cell and a recalibration of the weighing system. To avoid these encumbrances, a technique is called for which restricts such rotation within acceptable tolerances but which does not affect the dynamic performance of the load cells themselves.

SUMMARY

The present invention is addressed to an improved load cell mounting within weighing systems developing not only load induced vertical vectors of force but also dynamic, transversely induced force vectors. The load cells provided with these weighing systems are structured to incorporate instrumented rocker pins which are normally vertically oriented and serve as the counterforce component of the cells, thus a correction is required for avoiding load cell rotation. A technique has been achieved with the invention for limiting such rotation to acceptable tolerances through a recognition of the transient nature of such rotation inducing force vectors. In one control approach, rotation of these rocker pin containing load cells is abuttably restricted while a requisite freely-abutting and freely pivoting mounting of the cells is maintained. In another control technique, a resilient member is coupled with a load cell prone to such rotation in a manner wherein it is resiliently loaded only by the transient rotational vector forces. As these rotational forces subside, the rotationally induced but stored energy of the resilient member returns the load cell to its initial orientation, even through the load cell remains under a load induced compressive state. This return rotational motion is achieved inasmuch as, upon removal of the vector induced rotational forces, it has been discovered that the cells are readily rotated by relatively small spring developed forces.

Another feature of the invention provides a weighing apparatus which includes a base, a load receiving surface, at least one self-erecting rocker pin load cell positioned between the base and the load receiving surface for supporting the load receiving surface. The load cell has a longitudinal axis and the apparatus includes means for restricting rotation of the load cell about the longitudinal axis.

As another feature, the invention provides a method of constructing a self-stabilizing vehicle scale on a base which comprises the steps of positioning at least one self-erecting rocker pin load cell in an upright position on the base, the load cell having a longitudinal axis and the lower surface in contact with the base, and an upper contact surface;

supporting a load platform on the upper contact surface of the load cell; and restricting rotation of the load cell about the longitudinal axis.

As another aspect, the invention looks to a weighing system wherein a load to be weighed exhibiting both vertical and temporary transverse force vectors is positioned upon a load platform load receiving surface having freedom of movement, the load platform being supported upon load cells each with a given external surface and formed having a self-erecting rocker pin configured as a counterforce, each rocker pin having an axis along its lengthwise extent and oppositely disposed upper and lower contact surfaces of predetermined radii, the lower contact surface being mounted in freely-pivotal abutting contact at the upwardly disposed surface of a lower receiver supported from a ground base support and the upper contact surface being mounted for freely pivotal abutting contact with the downwardly disposed surface of an upper receiver supported by a load platform support to compressively receive the vertical force vectors, the point of the freely-abutting contact being variable with respect to movement of the platform occasioned by the transverse vector forces and creating transient rotational vector forces urging the rocker pins to rotate about the axis. The invention provides an improved rocker pin counterforce configured load cell mounting which includes a restrainer arrangement for providing a stable reference isolated from the rocker pin. Additionally, a rotation limit arrangement is coupled with the restrainer arrangement which is contactable with the load cell for restricting rotation thereof within predetermined limits by counteracting only the rotational force vectors while not affecting the vertical force vector induced compression reception and not affecting the freely pivotal mounting of the rocker pin.

As another feature, the invention provides a load cell rotation restriction method for use in a weighing system wherein a load to be weighed exhibiting both vertical and temporary transverse force vectors is positioned upon a load platform load receiving surface having freedom of movement, the load platform being supported upon load cells each formed having a self-erecting rocker pin configured as a counter-force, each rocker pin having an axis along its lengthwise extent and oppositely disposed upper and lower contact surfaces of predetermined radii, the lower contact surface being mounted in freely pivotal abutting contact at the upwardly disposed surface of a lower receiver supported from ground base and the upper contact surface being mounted for freely-pivotal abutting contact with the downwardly disposed surface of an upper receiver supported by the load platform to compressively receive the vertical force vectors, the points of the freely abutting contacts being variable with respect to movement of the platform occasioned by the transverse force vectors and creating transient rotational vector forces urging the rocker pins to rotate about the axis. The method comprises the steps of:

providing a restraint component for the rocker pin configured load cells to limit the extent of rotation to within two predetermined abutting positions;

positioning the restraint component for force transfer freely abutting engagement with the rocker pin to retain the rotation within the two abutting positions while not affecting the vertical force vector induced compressive reception or the freely pivotal movement upon the lower contact surface; and carrying out an evaluation of the vertical force vectors subsequent to the termination of the transient rotational vector forces.

As another feature of the invention, a method is provided for restricting rotation of the rocker pins employed within load cells the above-described weighing system which comprises the steps of:

providing a resilient member deformable from an initial orientation to a second orientation to store energy and which is releasable from the second orientation to return to the initial orientation; and coupling the resilient member with the rocker pin in a manner wherein the member is deformable to the second orientation only by the transient rotational vector forces effecting rotation of the rocker pin from a first position, and the resilient member is subsequently released from the second orientation upon removal of the transient rotational vector forces to return substantially to the initial orientation while drivably returning the rocker pin substantially to the first position.

As another aspect of the invention, a load cell assemblage is provided for use in a weighing system wherein a load to be weighed exhibiting vertical and temporary transverse force vectors is positioned upon a load platform load receiving surface having freedom of movement and which is supported by the assemblage above a ground base. The assemblage includes a rocker pin configured as an instrumented counterforce component having an axis along its lengthwise extent and upper and lower contact surfaces of rocker pin defining radii, the upper contact surface being in freely abutting compressive force transfer contact with the load platform and the lower contact surface extending to a peripherally disposed upstanding positioning surface, the positioning surface having a non-circular portion extending normally to the axis and of predetermined configuration and extent. A receiver is positioned to receive the vertical force vectors and has a receiving cavity with a support surface for supporting contact with a rocker pin contact surface, the cavity having upstanding side surfaces configured for effecting freely pivotal movement of the rocker pin about its contact with the support surface and including a non-circular portion of configuration corresponding with and of lesser extent than the predetermined configuration of the positioning surface, so as to permit freely abutting contact between the rocker pin positioning surface and the receiving cavity side surfaces non-circular portion, restricting rotation of the rocker pin about the axis during the freely pivotal movement.

Other features of the invention will, in part, be obvious and will, in part, appear hereinafter. The invention, accordingly, comprises the apparatus, system, and method possesing the construction, combination of elements, arrangement of parts and steps which are exemplified in the following detailed description.

For a fuller understanding of the nature and objects of the invention, reference should be had to the following detailed description taken in connection with the accompanying drawings.

DETAILED DESCRIPTION OF THE INVENTION

Figure 1:
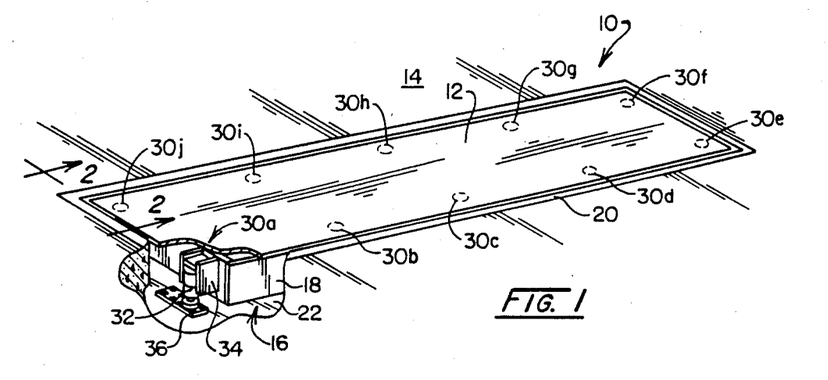
FIG. 1 is a perspective view of a weighing facility incorporating the features of the invention wich portions broken away to reveal internal structure.

Referring to FIG. 1, a platform weighing facility structured in accordance with the invention is revealed generally at 10. The facility 10 is configured, for example, for the purpose of weighing elongate loads such as trucks or the like. Consequently, the facility 10 is seen to be positioned such that the load receiving surface 12 is located to facilitate the entrance of trucks upon and exit therefrom. While the instant representation shows receiving surface 12 to be at ground surface, other structures may be employed. For example, surface 12 may be elevated above ground surface 14 and accessed by entrance and exit ramps. For any such design, the positioning of a truck or the like upon the surface 12 will result in the generation of both vertically imposed load vectors as well as temporary or very short term dynamic transverse loads which will be manifested as horizontal or transverse force vectors. Upon occasion, these transverse vectors of force will be of such diverse horizontal directions as to impose essentially a circular movement into the surface 12. Surface 12 is seen supported by and represents a component of a load platform represented generally at 16 which typically is provided as a rigid structure formed of steel members, one of which is shown at 18. Load platform 16 and its associated load receiving surface 12 additionally are seen to be located within a rectangularly shaped peripherally disposed rigid edge or frame 20 which extends to a horizontal surface ground base support 22.

Load platform 16 and its associated load receiving surface 12 are supported above the ground base 22 by a plurality of load cell structures positionally represented in FIG. 1 at 30a-30j. These load cells at positions 30a-30j essentially are structured in identical fashion, one being revealed in perspective at position 30a as having a load cell body portion 32 disposed in vertical fashion intermediate a bracket structure 34 coupled, in turn, to load platform 18 and a lower base plate 36.

Figure 2:
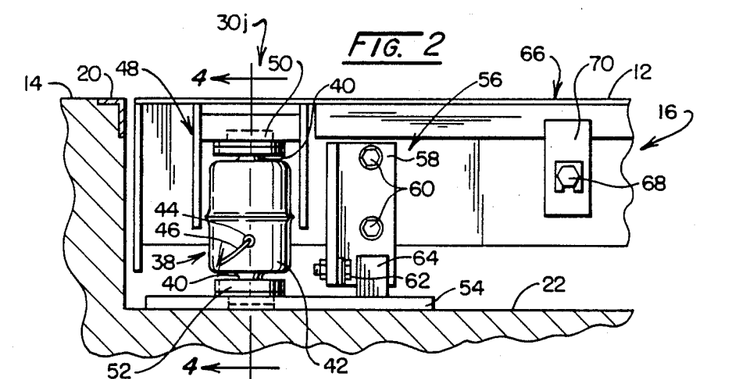
FIG. 2 is a partial sectional view taken through the plane 2—2 of FIG. 1.
Figure 3:
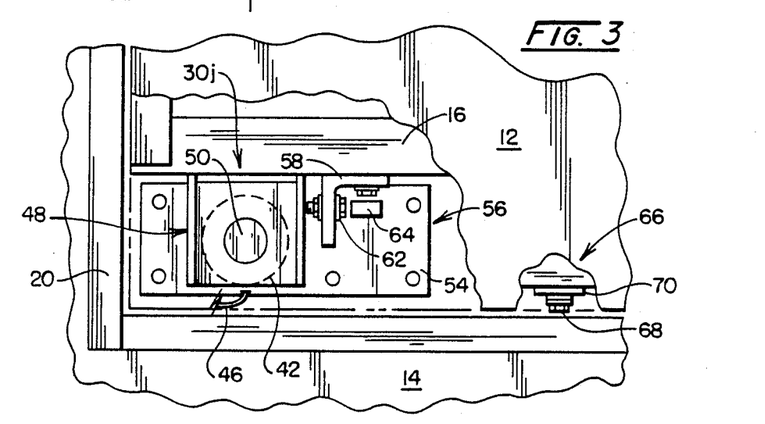
FIG. 3 is a top partial view of a portion of the facility of FIG. 1 at the location represented by FIG. 2.

Referring to FIG. 2, a side sectional view of the load cell at position 30j is revealed. In the figure, a load cell represented generally at 38 is seen to be structured having a centrally disposed rocker pin component serving as a counterforce and representing, in effect, a short vertical column, portions of which are revealed at 40. The centrally disposed portion of rocker pin component 40 contains load cell instrumentation which, in turn, is protectively sealed within a can-like enclosure 42. Of course, other instrumentation protecting techniques not involving such enclosures may be utilized. A port 44, which may be configured as an electrical connector is formed at the surface of container 42 to provide access for cabling 46 which, in turn, carries power supplies, instrumentation data lines and the like. Cabling 46 extends from the load cells at each location 30a-30j to a data collection and control facility (not shown). Load forces are transferred to the load cell 38 from the platform 16 by a bracket structure 48 which, in turn, supports an annular upper receiver 50. Correspondingly, the lower portion of rocker pin 40 is supported from a lower annularly shaped receiver 52 which is retained, in turn, within a base plate 54 coupled to ground base support 22. Thus, the given central axis of the rocker pin 40 is essentially vertical and compressively supports the load represented by the platform 16 and the load supported upon the surface 12 thereof. To assure the integrity of load transfer into each of the load cells as at 30, no transverse oriented support of the platform 16 is provided. In effect, it enjoys a freedom of movement. However, to retain essentially a vertical orientation for the axes of the rocker pin counterforce components of the load cells as at 38, transversely oriented bumper structures are provided with the facility 10. These structures will limit transverse motion in either of the major horizontal axes to a select small value, for example 1/16 inch. One degree or axial orientation of such restraint is provided by the bumper structure represented generally at 56. FIGS. 2 and 3 show this structure to be comprised of an angle bracket 58 secured by bolts 60 to the platform 16 in a vertical orientation. Bracket 58 carries a carefully shimmed contact bolt 62. Contact face of Bolt 62 is so shimmed that the contact face thereof is spaced the noted preselected distance from a contact surface of a stud 64 fixed in upstanding fashion to plate 54. In similar manner, a bumper structure 66 is provided for limiting movement of platform 16 along the normally disposed major transverse axis. This bumper structure, as represented at 66 is comprised of a shimmed contact bolt 68 coupled to a bracket 70 which is fixed, in turn, to one of the beams of platform 16. The contact surface of bolt 68 is thus spaced a predetermined limiting distance from a contact surface associated with edge structure 20. Several such bumper structures as at 56 and 68 may be incorporated within a facility as at 10 depending upon the desires of the designer.

Notwithstanding the very limited degree of horizontal or transverse movement thus acceded to the platform structure 16, it has been observed that a rotational force vector will be imparted to the rocker arm configured counterforce component 40 occasioned by induced transverse and temporary dynamics generally occurring with the movement of loads such as trucks onto the platform load receiving surface 12. In effect, a precessional form of movement is imparted into the columnar rocker pin counterforce components. The latter type movement occurs as these transverse load induced forces evoke a somewhat circular movement in the platform 16. While this movement is imparted into the load cells which, themselves, are unrestrained from any such movement, it is the nature of the rocker pin structure to self-erect or self-restore to a vertical orientation. However, as this return to vertical columnar orientation occurs, the positions of contact at the radiused surfaces of the rocker pin counterforce components will alter very slightly to the extent that, upon being restored to vertical, the points of contact between the platform and rocker pin and conversely between the lower receiver and the rocker pin may alter very slightly. This attribute of repositioning the contact point is discovered to induce a rotational vector into the load cells which, albeit transient in nature, represents a cumulative rotational effect. While such rotation may be bidirectional, it is statistically non-cancelling to the extent that the cabling as at 46 may commence to be stressed to breakage and/or to wind about enclosures 42 to effect a disruption of communication with control features of the weighing facility 10. Notwithstanding the presence of such implements as enclosure 42, the rotation of the load cell counterforce components occurs to cause such breakage and instrumentation damage Because such induced rotational vectors are transient in nature, as they cease to occur the load cells return to a purely compressive state wherein no rotation is induced. It has been observed that, in view of the point contact support at hand, rotation of of the load cells, for example by hand, is quite simply carried out notwithstanding a vertically oriented imposition of very high loads upon them. The approach of the instant invention is to restrict only the rotational movement of the load cells while retaining all of their attributes for self-erecting and purely compressive load evaluation response. This may be carried out by restricting only the vertically imposed vectors, either, in a preferred approach utilizing a restricting geometry at one side of the load cells or by resiliently and compliantly returning the load cells to an acceptable rotational orientation under conditions wherein the transient rotational vectors are not present.

Figure 4:
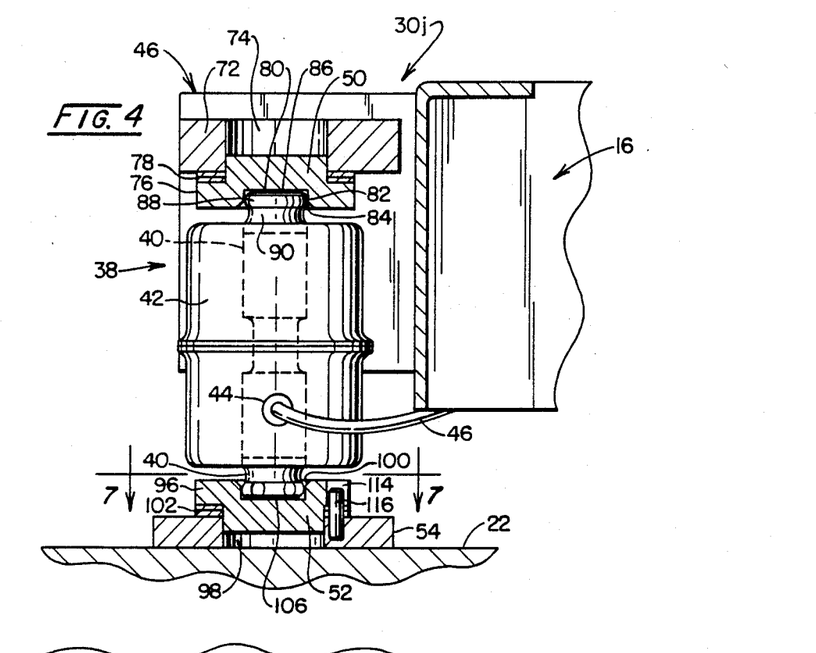
FIG. 4 is a sectional view taken through the plane 4—4 in FIG. 2.

Turning to FIG. 4, a partial sectional view of the load cell 38 is shown at an enhanced level of detail. The figure reveals that horizontal plate 72 of bracket 48 is configured having a circular opening 74 and serves as a support for the upper receiver 50. In this regard, a flange portion 76 of receiver 50 extends over the lower disposed surface of support plate 72 and the assembly 50 is adjusted in terms of vertical support position by a selection of annular shims as at 78. Receiver 50 additionally is configured having a centrally disposed rocker pin receiving cavity 80 of circular configuration and which flares at 82 outwardly from about the midpoint of the side surfaces thereof in conical profile to extend to its entrance opening at 84. Thus configured, the cavity 80 receives the curved or radiused contact surface 86 of the rocker pin 40 in freely abutting fashion and in a manner permitting freely pivotal movement thereof. To promote this freely pivotal movement, the side surfaces 88 of rocker pin 40 adjacent contact surface 86 are radiused and a radiused recessed portion 90 is formed adjacent the side surface 88.

Figure 5:
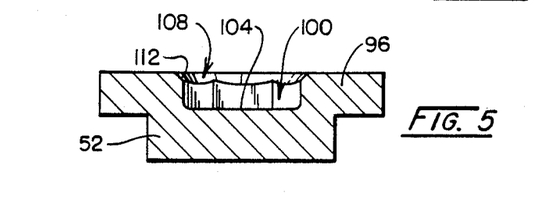
FIG. 5 is a sectional view of a receiver utilized in conjunction with FIG. 4.
Figures 6, 7:
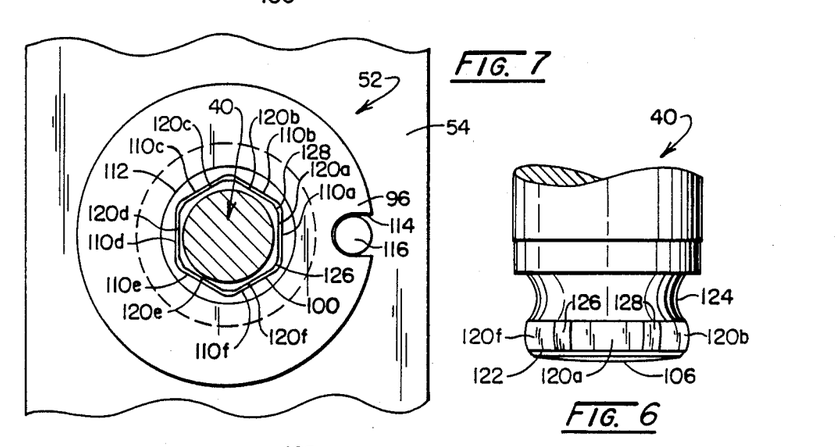
FIG. 6 is a partial front view of a rocker pin component employed with the load cell configuration of FIG. 4.
FIG. 7 is a partial sectional view taken through the plane 7—7 in FIG. 4.

In similar fashion, the lower receiver 52 is configured having an annular outwardly extending flange 96 and a central body portion which is mounted within an annular opening 98 within the support or baseplate 54. As before, a rocker pin receiving cavity 100 is formed within receiver 52. The elevation of the receiver 52 is adjusted by selection of appropriate annular shims as are revealed at 102. Looking additionally to FIG. 5, a cross-sectional view of the receiver 52 is provided. In the latter figure, receiver cavity 100 is seen extending to a substantially flat, integrally disposed surface 104 intended for freely-abutting contact with the radiused lower disposed contact surface 106 of rocker pin configured component 40 (see FIG. 6). The upstanding sidewall 108 of cavity 100 extends upwardly from surface 104 and is configured having substantially flat lateral portions of equal length to define a hexagonal profile. Looking additionally to FIG. 7, these lateral portions or "flats" are revealed at $110a-110f$. The figures further reveal that the lateral portions $110a-110f$ extend upwardly for a distance representing slightly greater than one-half the height of the cavity 100, whereupon the sidewalls 108 of the cavity are flared outwardly in 90° conical fashion to define an entrance opening 112. FIG. 7 additionally reveals that, for the embodiment disclosed, the receiver 52 is restrained from rotational movement by virtue of a slot 114 formed within flange 96 which abuttably engages a rigid pin 116 mounted within baseplate 54.

Referring to FIG. 6, the lower portion of rocker pin 40 extending upwardly from lower contact surface 106 is seen to be configured in correspondence with the configuration of the lateral portions $110a-110f$ of cavity 100. In this regard, the rocker pin 40 is configured such that the side portions as revealed at $120a-120f$ are configured having six equally dimensioned "flats" or positioning surfaces of corresponding hexagonal profile as the lateral portions $110a-110f$ of cavity 100. However, these side portions $120a-120f$ are of slightly lesser extent permitting a freely pivotal movement of the rocker pin 40 within the receiver 52. In general, the side portions are radiused in the manner of a right cylinder in the lateral direction to promote this freely pivotal movement. Additionally, an annular taper 122 is seen formed between the contact surface 106 periphery and the commencement of side portions $120a-120f$. As before, a recess as at 124 is formed in rocker pin component 40 above side portions $120a-120f$. To further promote the freely pivotal interaction of the rocker pin 40 with receiver 52, the positions of intersection of adjacent side portions $120a-120f$ are rounded or radiused. Correspondingly, such rounding or radiusing is provided at the mutual intersections of the ends of lateral portions $110a-110f$ in cavity 100. Not essential to the noted freely pivotal performance, such rounding is found to facilitate the process of manufacture. Two of these rounded regions are represented in FIGS. 6 and 7 at 126 and 128, the remaining such curved regions being unmarked in the interest of clarity.

With the arrangement shown, transient force vectors imposed upon the load cell 38 will, from time-to-time induce a corresponding transient rotation about its axis of very short duration. This rotation is restrained by the structuring of side portions $120a-120f$ of the lower portion of rocker pin component 40 as associated with the corresponding lateral portions $110a-110f$ of the cavity 100 of receiver 52. Imposed transient rotational vectors are opposed by the non-circular corresponding components to impart a transient torsional term into the load cell which essentially disappears following a very short interval of time of occurrence of rotational vector forces. Generally, load measurements are made following the imposition of the term as the load cell 38 assumes a purely compressive status under a vertically imposed load induced force vector. As is apparent, the rotation limiting approach described hereinabove may be developed with either or both the upper or lower contact surfaces 86 or 106 of the rocker pin component 40 at the desire of the designer.

Figure 8:
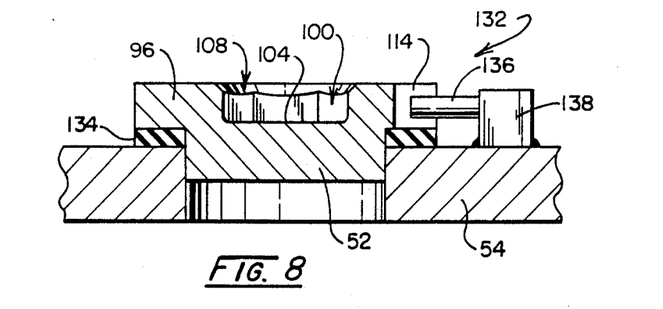
FIG. 8 is a sectional view of an alternate embodiment for the invention represented in FIG. 4.

Referring to FIG. 8, an adaptation to the rotation limiting arrangement heretofore described is revealed generally at 132. With this arrangement, the receiver 52 is rotationally mounted upon baseplate 54 by virtue of its being positioned upon an annular flat bearing 134 interposed between the upwardly disposed surface of base 54 and the lower disposed surface of flange portion 96. This bearing may be provided, for example, as a selflubricating polymeric sheet material. Additionally, shims (not shown) as earlier described at 102 may be provided for height adjustment purposes. With this arrangement, however, a rigid pin as earlier described at 116 (FIGS. 4 and 7) is replaced by a resilient motion restrictor extending in cantilever fashion from an upstanding stud 138 welded or otherwise fixed, in turn, to baseplate 54. Restrictor 136 may be provided, for example, as a rectangular piece of spring steel. By so resiliently restraining the retainer 52, thus permitting its restricted rotation, peak, transient rotational vector forces are compliantly accommodated to reduce wear between the rocker pin 40 and receiver 52. Non-circular configurations other than the hexagonal profile described above may be provided in conjunction with the motion restraining approach above described. For example, only one or less than six non-circular side surface region may be provided for the receiver and rocker pin assemblage and, conversely, corresponding profiles having greater than six surfaces may be developed. Of importance, the freely pivotal association between rocker pin receiver must be retained to achieve proper load cell performance.

Figure 9:
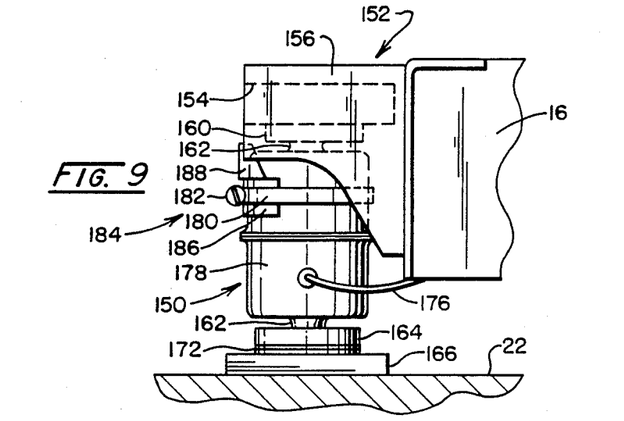
FIG. 9 is a partial side view of another configuration of the instant invention.
Figure 10:
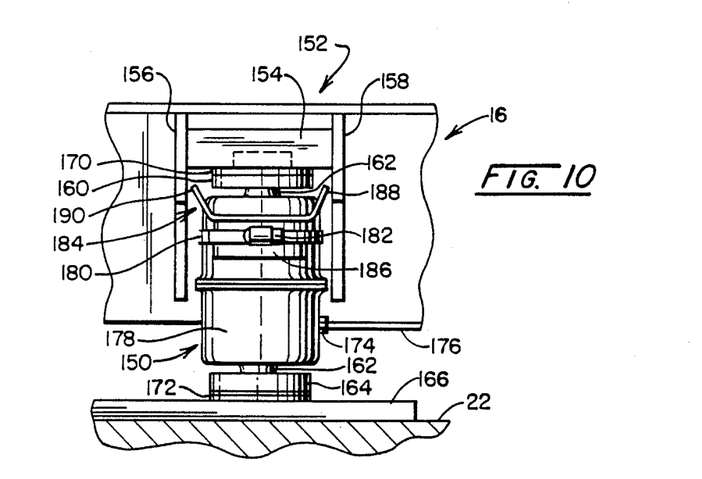
FIG. 10 is a partial front viw of the load cell configuration shown in FIG. 9.
Figure 11:
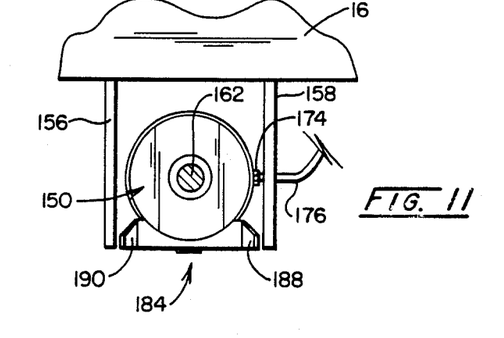
FIG. 11 is a partial top view of the load cell mounting configuration shown in FIGS. 9 and 10.

Referring to FIGS. 9-11, another embodiment of the invention is revealed. With this embodiment, the transient rotational vectors of force induced into the load cell assembly are permitted to evoke a corresponding rotation of the load cell in whichever rotational direction as might occur. However, as such rotation occurs on this transient basis, it is resiliently opposed by ever increasing oppositely directed and resiliently or spring derived return force vectors. Consequently, as the load induced transient rotational vectors of force cease or disappear, then the developed resilient countering force vectors of force return the load cell to its initial position. Thus, the load cell is returned to its initial position or orientation immediately following the imposition of any load induced rotational phenomena. Looking to FIG. 9, a load cell represented generally at 150 is seen supporting load platform 16 from ground base 22. The load platform 16 is supported from a bracket structure represented generally at 152 and having a horizontally disposed support plate 154. Plate 154 is, in turn, supported from two vertical plates 156 and 158 attached, in turn, to platform 16 (FIG. 10). An upper receiver 160 is attached to support plate 154 and, in turn, serves to provide a surface for freely abuttable contact with the corresponding curved contact surface of a rocker pin counterforce component 162. Correspondingly, the lower contact surface (not shown) of rocker pin component 162 engages a corresponding contact surface of lower receiver 164 which, in turn, is coupled to baseplate 166 positioned upon ground base 22. FIG. 10 shows that shims 170 and 172 are provided in conjunction with respective receivers 160 and 164 to adjust the vertical height of the load cell 150. A port as at 174 provides for input of cabling 176 as described hereinbefore.

Positioned about the container or enclosure 178 is a clamping band 180 which is tightened against the container 178 by a tightening assembly 182 including a machine screw as shown. This band 180 serves to retain a rotation limiter represented generally at 184 which is formed of resilient sheet material such as stainless steel and includes a cylindrically formed support portion 186 retained by band 180 and from which are formed two oppositely disposed resiliently deformable spring members or wings 188 and 190. As revealed in FIGS. 10 and 11, as the load cell 150 is subjected to rotational force vectors, one or the other of spring members 188 or 190 will be urged into abutting contact with a respective bumper surface of upstanding plates 158 and 156. Being connected to platform 16, the bumper surfaces of plates 156 and 158 essentially provide a stable reference which is dynamically isolated from the rocker pin 162 counterforce component function. Of course, such a bumpering function can be supported, for example, from the ground base 22. With the arrangement shown, upon rotation of load cell 150, abutting contact is made, for example, between resilient component 188 and the bumper surface of plate 158 to resiliently store energy until such time as the transient rotation inducing force vectors are removed, whereupon, the thus-deformed component 188 resiliently returns or rotates the load cell 150 to its original position. As is apparent, compressively deformable helical springs and the like may be employed to achieve the function of component 184.

Figure 12:
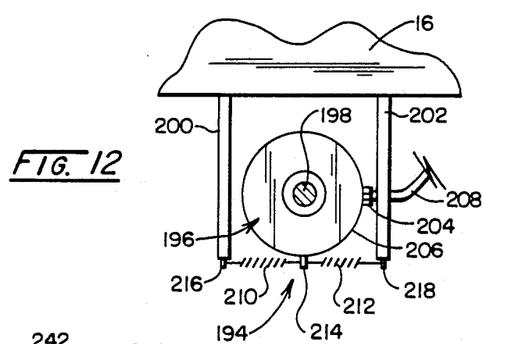
FIG. 12 is a top schematic view of another embodiment of a load cell mounting configuration according to the invention.

Looking to FIG. 12, another positional restoration assemblage is revealed in general at 194. Assemblage 194 operates in conjunction with a load cell represented generally at 196 which is configured and mounted in the same manner as represented in conjunction with FIGS. 9 and 10. In this regard, the load cell 196 is configured having a centrally-disposed rocker pin configured counterforce component 198 which extends between two retainers (not shown). The upper one of the latter retainers is supported by a bracket which includes vertical plates 200 and 202 configured in the same manner as respective plates 156 and 158 shown in FIG. 10. An output port extending from instrumentation container 206 provides for the connection of cabling as at 208 for providing a power supply to the instrumentation contained therein, as well as control and data retrieval information. With the instant embodiment shown, the load cell 196 is constrained within a preferred rotational orentation through the utilization of two helical springs pre-loaded in tension schematically represented at 210 and 212 which are coupled to the container 206 of load cell 196 at a connector 214 extending from the surface thereof and fixed thereto. The opposite side of spring 210 is seen coupled at 216 to vertical plate 200, while the opposite side of spring 212 is coupled to plate 202 at 218. With the arrangement shown, any rotational inducing transient force vector imposed upon load cell 196 is countered by one or the other of springs 210 or 212 until such time as the transient rotational input force is removed. At such time, the oppositely acting springs restore load cell 196 to its initial orientation. A singular preloaded spring can be employed in place of springs 210 and 212 extending between points 216 and 218. Further, a single spring deformable in both tension and compression may be coupled between the load cell and either one of the points 216 or 218.

Figure 13:
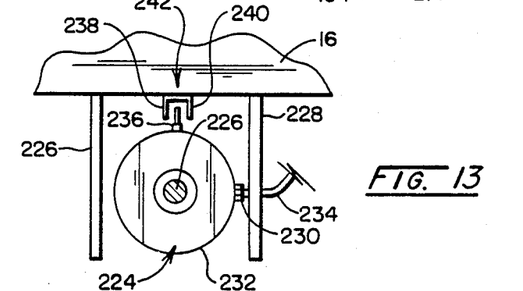
FIG. 13 is a schematic partial top view of another load cell mounting configuration according to the invention.

Looking to FIG. 13, still another arrangement for restraining the rotational movement of a load cell while not affecting its performance as a counterforce component is revealed. As before, the load cell represented generally at 224 is mounted in the manner described in conjunction with FIGS. 9 and 10. In this regard, the centrally disposed rocking pin configured component 226 is in freely abutting contact at its upper contact surface with a receiver (not shown) supported by a bracket assembly coupled to load platform 16. Two side plates of this bracket are represented at 226 and 228 which correspond with respective plates 156 and 158 shown in FIG. 10. An instrumentation access port is represented at 230 which is coupled to the external surface of container 232 of load cell 224. The port 230 provides coupling to such instrumentation with an appropriate cabling 234. In accordance with the instant arrangement, a rod-like engaging component 236 is fixed to and extends outwardly from container 232 in an orientation essentially perpendicular to the central axis of rocker pin component 226. The resilient engaging component 236 is shown protruding between two resilient bumper components 238 and 240 of a U-shaped bracket represented generally at 242 fixed to and extending from platform 16. As before, the platform 16 functions, for the topology, shown as a restrainer providing a stable reference which is dynamically isolated from the load cell 224.

Figure 14:
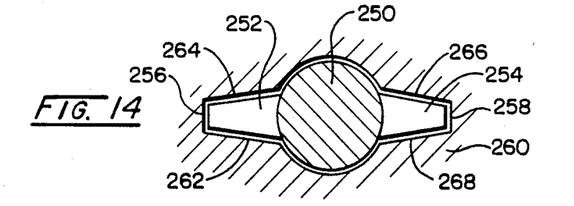
FIG. 14 is a schematic and partial sectional view of still another configuration of the load cell mounting assemblage according to the invention.

Turning to FIG. 14, a symmetrical arrangement corresponding with the embodiment of FIG. 13 but which may be machined into the rocker pin counterforce component of a load cell is revealed. In this arrangement, the lower side portion or neck of the rocker pin component as represented at 250 may be machined or bored to receive two oppositely-disposed checking pins 252 and 254. These pins optionally may be formed of resilient or rigid material. Pins 252 and 254 are so positioned so as to be engageable with the machined surfaces of respective cavities 256 and 258 formed within an associated receiver, the surface of which is represented at 260. Thus, pin 252 will move into a resilient, freely abutting association with one surface 262 or 264 of cavity 256, while corresponding pin 254 will move into freely abutting but resilient contact with a corresponding surface 266 or 268 of cavity 258. A convenient structuring for the instant embodiment is achieved by forming pins 252 and 254 as a single, rod-like component, the opposite ends of which are tapered. This single components is inserted within a transverse bore extending through the neck of the rocker pin component.

Since certain changes may be made in the above system, apparatus, and method without departing from the scope of the invention herein involved, it is intended that all matter contained in the description thereof or shown in the accompanying drawings shall be interpreted as illustrative and not in a limiting sense.

We claim:

1. Weighing apparatus comprising a base, a load cell receiving surface, at least one self-erecting rocker pin load cell positioned between said base and said load receiving surface for supporting said load receiving surface, said load cell having a longitudinal axis and being subject to both vertical and temporary transverse force vectors creating transient rotational force vectors urging said rocker pin to rotate about said longitudinal axis, and means for restricting rotation of said load cell about said longitudinal axis.

2. Weighing apparatus as claimed in claim 1 wherein said rotation restricting means includes restrainer means for providing a stable reference isolated from said rocker pin, and rotation limit means between said restrainer means and said load cell for restriting rotation thereof.

3. Weighing apparatus as claimed in claim 2 in which said rotation limit means comprising spring means mounted between said restrainer means and said load cell along an axis substantially transverse to said longitudinal axis for resiliently returning said load cell to an initial position subsequent to the induced rotation thereof.

4. Weighing apparatus as claimed in claim 2 in which said rotation limit means comprises:
   an engaging component extending from said rocker pin load cell generally normally to said longitudinal axis; and
   first and second bumper components fixed to said restrainer means, mutually spaced apart a distance representing a predetermined limit and located for freely abutting contact with said engaging component upon rotation of said load cell.

5. Weighing apparatus as claimed in claim 4 in which said first and second bumper components are resilient.

6. Weighing apparatus as claimed in claim 2 in which said rotation limit means comprises:
   first and second oppositely disposed resiliently deformable springs fixed to and extending outwardly from said load cell generally normally to said longitudinal axis to respective first and second abutting surfaces; and
   first and second bumper surfaces fixed to said restrainer means, mutually spaced apart and positioned for freely abutting engagement with one of said first and second abutting surfaces upon rotational movement of said load cell toward a predetermined limit.

7. Weighing apparatus as claimed in claim 2 in which said rotation limit means comprises:
   first and second resilient checking pins, fixed to and extending symmetrically outwardly from said load cell; and
   first and second cavity defining surfaces formed within said restrainer means, positioned to receive respective said first and second resilient checking pins and dimensioned for restricting said rocker pin rotation within predetermined limits.

8. Weighing apparatus as claimed in claim 1 in which said means for restricting rotation comprises:
   a receiver mounted in limited rotatable relationship with said apparatus and having a rocker pin receiving cavity with an upstanding sidewall formed having a lateral portion of non-circular configuration and extent and configured for effecting freely pivotal abutting support of said rocker pin load cell; and
   said rocker pin load cell includes an end mountable within said cavity and having a peripherally disposed positioning surface with a non-circular portion corresponding with and of lesser extent than said lateral portion.

9. Weighing apparatus as claimed in claim 8 in which said receiver includes:
   a bearing mounted therewith for effecting said rotatable relationship; and
   resilient restrictor means for resiliently restricting the extent of rotation of said receiver.

10. Weighing apparatus as claimed in claim 8 in which said receiver is fixed in non-rotatable relationship with said apparatus.

11. A method of constructing a self-stabilizing vehicle scale on a base comprising the steps of positioning at least one self-erecting rocker pin load cell in an upright position on said base, said load cell having a longitudinal axis and a lower surface in contact with said base and an upper contact surface and being subject to both vertical and temporary transverse force vectors creating transient rotational force vectors urging said rocker pin to rotate about said longitudinal axis; supporting a load platform on the upper contact surface of the load cell; and restricting rotation of said load cell about said longitudinal axis.

12. A method as claimed in claim 11 wherein the step of restricting rotation of the load cell includes the steps of providing a stable reference isolated from the load cell and coupling rotation inhibiting means between the stable reference and the load cell.

13. In a weighing system wherein a load to be weighed exhibiting both vertical and temporary transverse force vectors is positioned upon a load platform load receiving surface having freedom of movement, said load platform being supported upon load cells each with a given external surface and formed having a self erecting rocker pin configured as a counterforce, each rocker pin having an axis along its lengthwise extent and oppositely disposed upper and lower contact surfaces of predetermined radii, the said lower contact surface being mounted in freely pivotal abutting contact at the upwardly disposed surface of a lower receiver supported from a ground base support and the said upper contact surface being mounted for freely pivotal abutting contact with the downwardly disposed surface of an upper receiver supported by a said load platform support to compressively receive said vertical force vectors, the point of said freely abutting contact being variable with respect to movement of said platform occasioned by said transverse force vectors and creating transient rotational force vectors urging said rocker pins to rotate about said axis, the improved rocker pin counterforce configured load cell mounting comprising:

restrainer means for providing a stable reference isolated from said rocker pin; and rotation limit means coupled with said restrainer means, contactable with said load cell for restricting said rotation thereof within predetermined limits by counteracting only said rotational force vectors while not affecting said vertical force vector induced compression reception, and not affecting said freely pivotal mounting.

14. The rocker pin counterforce configured load cell mounting of claim 13 in which:

one said receiver is configured having a rocker pin receiving cavity with a substantially flat internally disposed surface as said receiver surface for effecting said freely pivotal abutting contact with a said rocker pin contact surface;

said rotation limit means comprises an upstanding side wall of said cavity formed having a lateral portion of non-circular configuration and extent; and said rocker pin being formed having a side portion extending to one said contact surface, said side portion being of non-circular configuration corresponding with said side wall lateral portion configuration and of extent less than said side wall lateral portion to provide said freely pivotal abutting contact while effecting said restriction of rotation by said rocker pin.

15. The rocker pin counterforce configured load cell mounting of claim 14 in which said rocker pin side portion of non-circular configuration is configured as a segment of a righ cylinder.

16. The rocker pin counterforce configured load cell mounting of claim 14 in which:

said receiver cavity is formed having six said upstanding side wall lateral portions of substantially linear configuration and of generally hexagonal profile; and said rocker pin side portion is configured having a corresponding said hexagonal profile.

17. The rocker pin counterforce configured load cell mounting of claim 16 in which said rocker pin side portion of substantially linear configuration is configured as a segment of a right cylinder.

18. The rocker pin counterforce configured load cell mounting of claim 14 in which said rotation limit means further comprises:

a bearing positioned intermediate said support of said one receiver for providing a rotational mounting thereof; and resilient restrictor means coupled with said restrainer means for resiliently restricting the extent of rotation of said receiver about said bearing.

19. The rocker pin counterforce configured load cell mounting of claim 18 in which said bearing is formed of self-lubricating polymeric sheet material.

20. The rocker pin counterforce configured load cell mounting of claim 13 in which said rotation limit means comprises spring means mounted between said restrainer means and said load cell external surface along an axis substantially transverse to said rocker pin axis for resiliently returning said load cell about said rocker pin axis to an initial position thereof subsequent to application of said rotational force vectors.

21. The rocker pin counterforce configured load cell mounting of claim 13 in which said rotation limit means comprises:

an engaging component extending from said load cell external surface generally normally to said rocker pin axis; and first and second bumper components fixed to said restrainer means, mutually spaced apart a distance corresponding with said predetermined limit and located for freely abutting contact with said engaging component upon the rotation of said load cell.

22. The rocker pin counterforce configured load cell mounting of claim 21 in which said first and second bumper components are resilient.

23. The rocker pin counterforce configured load cell mounting of claim 13 in which said rotation limit means comprises:

first and second oppositely disposed resiliently deformable springs fixed to and extending outwardly from said load cell surface generally normally to said rocker pin axis to respective first and second abutting surfaces; and first and second bumper surfaces fixed to said restrainer means, mutually spaced apart and positioned for freely abutting engagement with one of said first and second abutting surfaces upon rotational movement of said rocker pin toward a said predetermined limit.

24. The rocker pin counterforce configured load cell mounting of claim 13 in which said rotation limit means comprises:
   first and second resilient checking pins, fixed to and extending symmetrically outwardly from said rocker pin adjacent one said contact surface thereof; and
   first and second cavity defining surfaces formed within said restrainer means, positioned to receive respective said first and second resilient checking pins and dimensioned for restricting said rocker pin rotation within said predetermined limits.

25. In a weighing system wherein a load to be weighed exhibiting both vertical and temporary transverse force vectors is positioned upon a load platform load receiving surface having freedom of movement, said load platform being supported upon load cells each formed having a self-erecting rocker pin configured as a counterforce, each rocker pin having an axis along its lengthwise extent and oppositely disposed upper and lower contact surfaces of predetermined radii, the said lower contact surface being mounted in freely pivotal abutting contact at the upwardly disposed surface of a lower receiver supported from ground base and the said upper contact surface being mounted for freely pivotal abutting contact with the downwardly disposed surface of an upper receiver supported by said load platform to compressively receive said vertical force vectors, the points of said freely abutting contacts being variable with respect to movement of said platform occasioned by said transverse force vectors and creating transient rotational vector forces urging said rocker pins to rotate about said axis, the method for restricting rotation of said rocker pins about associated said axes comprising the steps of:
   providing a restraint component for a said rocker pin configured load cells to limit the extent of said rotation to within two predetermined abutting positions;
   positioning said restraint component for force transfer freely abutting engagement with said rocker pin to retain said rotation within said two abutting positions while not affecting said vertical force vector induced compressive reception or said freely pivotal movement upon said lower contact surface; and
   carrying out evaluation of said vertical force vectors subsequent to the termination of said transient rotational vector forces.

26. In a weighing system wherein a load to be weighed exhibiting both vertical and temporary transverse force vectors is positioned upon a load platform load receiving surface having freedom of movement, said load platform being supported upon load cells each formed having a self-erecting rocker pin configured as a counterforce, each rocker pin having an axis along its lengthwise extend and oppositely disposed upper and lower contact surfaces of predetermined radii, the said lower contact surface being mounted in freely pivotal abutting contact at the upwardly disposed surface of a lower receiver supported from ground base and the said upper contact surface being mounted for freely pivotal abutting contact with the downwardly disposed surface of an upper receiver supported by said load platform to compressively receive said vertical force vectors, the points of said freely abutting contacts being variable with respect to movement of said platform occasioned by said transverse force vectors and creating transient rotational vector forces urging said rocker pins to rotate about said axis, the method for restricting rotation of said rocker pins about associated said axes comprising the steps of:
   providing a resilient member deformable from an initial orientation to a second orientation to store energy, and releasable from said second orientation to return to said initial orientation; and
   coupling said resilient member with said rocker pin in a manner wherein said resilient member is deformable to said second orientation only by said transient rotational vector forces effecting rotation of said rocker pin from a first position, and said resilient member is subsequently released from said second orientation upon removal of said transient rotational vector forces to return substantially to said initial orientation while drivably returning said rocker pin substantially to said first position.

27. A load cell assemblage for use in a weighing system wherein a load to be weighed exhibiting vertical and temporary transverse force vectors is positioned upon a load platform load receiving surface having freedom of movement and which is supported by said assemblage above a ground base, comprising:
   a rocker pin configured as an instrumented counterforce component, having an axis along its lengthwise extent, and upper and lower contact surfaces of rocker pin defining radii, said upper contact surface being in freely abutting compressive force transfer contact with said load platform, said lower contact surface extending to a peripherally disposed upstanding positioning surface, said positioning surface having a non-circular portion extending normally to said axis and of predetermined configuration and extent; and
   a receiver positioned to receive said vertical force vectors and having a receiving cavity with a bottom support surface for supporting contact with a said rocker pin contact surface, said cavity having upstanding side surfaces configured for effecting freely pivotal movement of said rocker pin about its contact with said support surface and including a non-circular portion of configuration corresponding with and of lesser extent than that of said predetermined configuration of said positioning surface, so as to permit freely abutting contact between said rocker pin positioning surface and said receiving cavity side surfaces non-circular portion, restricting rotation of said rocker pin about said axis during said freely pivotal movement.

28. The load cell assemblage of claim 27 in which said rocker pin positioning surface is rounded transversely to said axis.

29. The load cell assemblage of claim 28 including:
   bearing means for providing a rotational mounting of said receiver; and
   resilient restrictor means coupled for resiliently restricting the extent of rotation of said receiver.

30. The load cell assemblage of claim 29 in which said bearing is formed of self-lubricating polymeric sheet material.

31. The load cell assemblage of claim 27 in which:
   said receiving cavity is formed having six said upstanding side surface non-circular portions arranged to define a generally hexagonal profile; and
   said rocker pin is configured having six said positioning surfaces arranged to define a generally hexagonal profile.

32. The load cell assemblage of claim 31 in which said rocker pin positioning surface is rounded transversely to said axis.

* * * * *